(12) United States Patent
Aurongzeb et al.

(10) Patent No.: US 12,143,523 B2
(45) Date of Patent: Nov. 12, 2024

(54) RECYCLED ALUMINUM WITH GLASS FIBER REINFORCED POLYLACTIC ACID (PLA) BIOPLASTIC FOR AN INFORMATION HANDLING SYSTEM

(71) Applicant: Dell Products L.P., Round Rock, TX (US)

(72) Inventors: Deeder M. Aurongzeb, Austin, TX (US); Gerald Rene Pelissier, Mendham, NJ (US); Enoch Chen, Wenshan District (TW); Peng Lip Goh, Singapore (SG); Weijong Sheu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 408 days.

(21) Appl. No.: 17/471,521

(22) Filed: Sep. 10, 2021

(65) Prior Publication Data

US 2023/0085487 A1    Mar. 16, 2023

(51) Int. Cl.
*H04M 1/02*    (2006.01)
*B29B 17/00*   (2006.01)
*B32B 27/36*   (2006.01)
*B29K 67/00*   (2006.01)

(52) U.S. Cl.
CPC ....... *H04M 1/0266* (2013.01); *B29B 17/0042* (2013.01); *B32B 27/36* (2013.01); *B29K 2067/046* (2013.01); *B32B 2262/101* (2013.01); *B32B 2457/20* (2013.01); *H04M 2201/38* (2013.01)

(58) Field of Classification Search
CPC ............ H04M 1/0266; H04M 2201/38; B29B 17/0042; B32B 27/36; B32B 2262/101; B32B 2457/20; B29K 2067/046
See application file for complete search history.

(56) References Cited

U.S. PATENT DOCUMENTS

| | | | |
|---|---|---|---|
| 11,045,913 B1* | 6/2021 | Wieler | H05K 13/0486 |
| 2008/0105587 A1* | 5/2008 | Hawes | B65D 65/466 |
| | | | 206/532 |
| 2009/0246544 A1* | 10/2009 | Narita | C08J 7/048 |
| | | | 525/450 |
| 2014/0168877 A1* | 6/2014 | Theobald | G06F 1/1679 |
| | | | 361/679.55 |
| 2014/0353028 A1* | 12/2014 | Lin | B21K 23/00 |
| | | | 148/695 |
| 2017/0316300 A1* | 11/2017 | Herslow | C25D 11/243 |
| 2019/0099982 A1* | 4/2019 | Yokoyama | B23K 11/34 |
| 2020/0195292 A1* | 6/2020 | Liu | H04B 1/3888 |
| 2020/0199979 A1* | 6/2020 | Fripp | E21B 43/086 |
| 2021/0110231 A1* | 4/2021 | Finn | G06K 19/025 |
| 2021/0354374 A1* | 11/2021 | Hamoudi | B29C 64/245 |

* cited by examiner

*Primary Examiner* — Junpeng Chen
(74) *Attorney, Agent, or Firm* — Norton Rose Fulbright LLP

(57) ABSTRACT

Disclosed is a covering for an information handling system. The covering includes a first layer and a second layer. The first layer is a polylactic acid layer that can be reinforced with a reinforcing component, such as glass fibers. The second layer is an aluminum layer, and can include at least 50% recycled aluminum. The outer surface of the first layer may be provided with a graphene-containing coating that can help improve thermal management.

18 Claims, 4 Drawing Sheets

RECYCLED ALUMINUM WITH GLASS FIBER REINFORCED POLYLACTIC ACID (PLA) BIOPLASTIC FOR AN INFORMATION HANDLING SYSTEM

BACKGROUND

A. Field of the Disclosure

The disclosure generally relates to a covering for an information handling system. In some embodiments, the disclosure describes a covering of an information handling system that includes high recycled content and/or biologically-derived plastic.

B. Description of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The increase in the number of information handling systems used by consumers, and the pace at which new models are introduced creates a situation where many consumers replace electronic device components on a frequent basis. Many of these components are discarded as waste, end up in landfills, and remain buried in our planet for hundreds of years, if not longer.

BRIEF SUMMARY

The amount of recycled content can be increased in embodiments of this disclosure. A cover for an information handling system component may have a relatively high degree of recycled content such as, for example, at least 50% recycled content, with a bi-layer covering in which one of the layers is made of aluminum that includes at least 50% recycled content. The covering can also include a layer of polylactic acid (PLA) bioplastic that is derived from biological sources.

Some aspects of the disclosure are directed to a covering for an information handling system. The covering can form at least a portion of a front covering, a back covering, and/or a palm rest of the information handling system. In some aspects, the covering comprises a first layer comprising a composition comprising a polylactic acid (PLA) and glass, and a second layer comprising recycled aluminum. The first layer can have a thickness ranging from 0.01 mm to 0.1 mm. In some aspects, the glass comprises glass fibers. The glass fibers may have an average diameter of 1 to 25 micrometers (μm) and/or an average length of 0.1 mm to 20 mm In some aspects, the glass fibers are chopped glass fibers. The polylactic acid can have a modulus of 40-120 gigapascals (GPa). In some aspects, the polylactic acid can be enforced with up to 20 wt. % of a reinforcing component. The polylactic acid can be reinforced with 1, 2, 3, 4, 5, 6, 7, 8, 9, 10, 11, 12, 13, 14, 15, 16, 17, 18, 19, or 20% of a reinforcing component, or any value therein. The polylactic acid reinforcing component can be jute or carbon fiber. In some aspects, the first layer composition can include from 50 wt. % to 90 wt. % of the polylactic acid and from 10 wt. % to 50 wt. % of the glass. The first layer can be designed with structures for assembly and/or use, including but not limited to snaps, ribs, and through-holes. In some aspects, glass fiber reinforced PLA bioplastic plates are hybrid-molded with hard plastic first to form internally structural pieces. The hybrid-molded part may be bonded onto a stamped aluminum part in room temperature, with room temperature bonding reducing the risk of part warpage. In some aspects, glass fiber reinforced PLA bioplastic plates have low density but excellent mechanical properties, such as impact resistance strength, to meet enforcement purpose.

The first layer can further include a coating. In some aspects, the coating is provided on a surface of the first layer facing opposite the second layer. In some aspects, the coating comprises graphene. In some aspects, the coating is a paint that includes graphene. The coating may protect the covering and/or alter the appearance (e.g., color or texture) of the covering and/or provide functionality (e.g., thermal conduction) to the covering.

The second layer can have a thickness of up to and including 0.8 mm. In some aspects, the second layer has a thickness ranging from 0.2 mm to 0.6 mm. The second layer can have a thickness of 0.2, 0.3, 0.4, 0.5, or 0.6 mm, or any value therein. In some aspects, the second layer comprises an aluminum alloy that includes the recycled aluminum and at least one of magnesium, silicon, or chromium. In some aspects, the recycled aluminum can include at least 50% recycled content. The recycled aluminum can include at least 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100% recycled content, or any value therein. In some aspects, the magnesium, silicon, and/or chromium may be recycled. The aluminum alloy can comprise at least one of 5052-aluminum alloy, 6061-aluminum alloy, and 6063-aluminum alloy. In some aspects, the second layer is anodized to provide a protective coating of oxidized aluminum on the outer surface of the aluminum.

In some aspects, the composition has a tensile strength of at least 70 MPa, preferably 105 Mpa to 130 Mpa, as measured in accordance with ASTM D638. In some aspects, the composition has a flexural strength of at least 110 Mpa, preferably 120 Mpa to 170 Mpa, as measured in accordance with ASTM D790A. In some aspects, the composition has a flexural modulus of at least 4000 MPa, preferably 7000 Mpa to 15000 Mpa, as measured in accordance with ASTM D790A. In some aspects, the composition has a notched Izod impact resistance of at least 20 J/m, preferably 30 J/m to 80 J/m, as measured in accordance with ASTM D256 (⅛ in, 3.2 mm). In some aspects, the composition has a heat deflection temperature of at least 80° C. at 0.455 Mpa, preferably 130° C. to 200° C. at 0.455 Mpa, as measured in accordance with ASTM D648.

Some aspects of the disclosure are directed to a method for forming a covering for an information handling system. The method can include the steps of forming a first layer by molding a composition comprising a polylactic acid (PLA) and glass, forming a second layer by forming a sheet comprising aluminum by at least one of stamping, pressing or punching a metal sheet, and bonding the first layer and second layer. Forming of the second layer can entail stamping, pressing, and/or punching sheets or plates of aluminum. In some aspects, the first and second layers are bonded at room temperature. The first and second layers may be bonded, for example, by use of an adhesive or by stamping the PLA first layer onto the aluminum second layer. In some aspects, the first and second layers may be bonded using an adhesive. A coating can be provided on a surface of the first layer facing opposite the second layer. The coating can be a coating that includes graphene. In some aspects, the coating is a paint that includes graphene.

Some aspects of the disclosure are directed to an information handling system that includes a chassis forming at least a partial enclosure around an enclosed volume configured to house components of the information handling system. At least a portion of the chassis can include a first layer comprising a composition comprising a polylactic acid (PLA) and glass fibers and a second layer comprising recycled aluminum. In some aspects, the recycled aluminum can include at least 50% recycled content. The recycled aluminum can include at least 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100% recycled content, or any value therein. The information handling system can include a graphene paint on a surface of the second layer facing opposite the first layer.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to other aspects of the invention. It is contemplated that any embodiment discussed herein can be implemented with respect to any method or composition of the invention, and vice versa. Furthermore, compositions the invention can be used to achieve methods of the invention.

The following includes definitions of various terms and phrases used throughout this specification.

As used herein recycle content of a material refers to wt. % of the material obtained from, made from and/or recovered from waste. Unless mentioned otherwise the waste can be post-industrial and post-consumer waste. Post-consumer waste of a material is a waste generated by a customer of a substrate containing the material. Post-industrial waste is waste generated during a production process of a product and has not used in the consumer market. Glass fibers are thin strands of silica-based or other formulation glass that are extruded into many fibers with small diameters suitable for textile processing. Jute is a long, soft, shiny bast fiber that can be spun into coarse, strong threads.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %," "vol. %," or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component. The term "ppm" refer to parts per million by weight, based on the total weight, of material that includes the component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The covering of the present invention can "comprise," "consist(s) essentially of," or "consist of" particular ingredients, components, compositions, etc. disclosed throughout the specification. In one aspect of the present invention, and with reference to the transitional phrase "consist(s) essentially of" or "consisting essentially of," a basic and novel characteristic of the present invention can include an information handling system covering containing an aluminum layer that includes at least a portion of recycled aluminum and a bioplastic layer that includes biologically-derived polylactic acid.

Other objects, features and advantages of the present invention will become apparent from the following detailed description and examples. It should be understood, however, that the detailed description and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings. While the invention is susceptible to various modifications and alternative forms, specific embodiments thereof are shown by way of example in the drawings. The drawings may not be to scale.

DETAILED DESCRIPTION

A covering for an information handling system may include secondary or recycled aluminum. Society uses aluminum that is derived from primary or secondary sources. Primary aluminum sources include previously-unused aluminum, sometimes referred to as virgin aluminum, that is obtained from refinement of aluminum-containing ores. Secondary aluminum sources include aluminum that has entered the economy but is no longer serving its initial purpose. The environmental benefits of employing recycling aluminum include conserving energy, landscapes, and natural resources, and reducing toxic and nontoxic waste streams. The covering also includes a polylactic acid component that can be sourced from renewable and/or sustainable agricultural resources. For example, the polylactic acid can be a bioplastic variety that is obtained by bacterial fermentation of carbohydrates obtained from plant matter. By incorporating recycled aluminum and agriculturally-derived polylactic acid bioplastic into a covering for an information handling system, the present inventors have created an attractive alternative for consumers who are seeking environmentally-friendly personal information handling systems that have reduced carbon footprints.

These and other non-limiting aspects of the present disclosure are discussed in further detail in the following sections.

Figure 1:
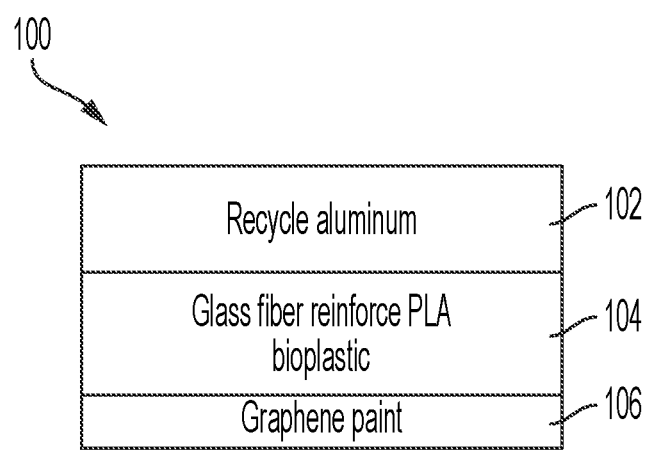
FIG. 1: Schematic of a covering for an information handling system according to some embodiments of the disclosure.

Referring to FIG. 1, a schematic of a covering 100 according to one example of the present disclosure is shown. The covering 100 includes a layer of aluminum 102 having a thickness of 0.4 mm. The layer of aluminum 102 can include at least 50% by weight of recycled aluminum. The layer of aluminum 102 can include at least 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100% recycled content, or any value therein. In some aspects, the aluminum 102 may include an aluminum honeycomb. Adjacent to the layer of aluminum 102 is a layer of glass fiber-reinforced polylactic acid (PLA) 104. Glass fiber-reinforced polylactic acid exhibits low density and attractive mechanical properties, such as impact-resistant strength that can be useful in situations where the information handling system is dropped. The PLA of layer 104 may be a bioplastic.

On the surface of the layer of glass fiber-reinforced polylactic acid 104 is provided a coating of graphene paint 106. The coating of graphene paint 106 can serve as a conductor of heat and can improve thermal management. The layer of glass fiber-reinforced polylactic acid 104 can be further reinforced with up to 20 wt. % by weight of a reinforcing component, based on the combined amounts of polylactic acid and glass. The reinforcing component can be jute or carbon fiber.

A covering for an information handling system can be made. The covering can include a first layer comprising glass fiber-reinforced PLA and a second layer comprising aluminum. The second layer can include at least 50% recycled aluminum. The glass fiber-reinforced PLA can be bonded to the aluminum layer to provide the covering for the information handling system. The covering can be provided with a coating of graphene-containing paint on the surface of the PLA layer that is opposite the aluminum layer. The use of glass fiber-reinforced PLA can add strength to the aluminum layer and impart strength to the overall, bi-layer covering.

Figure 2:
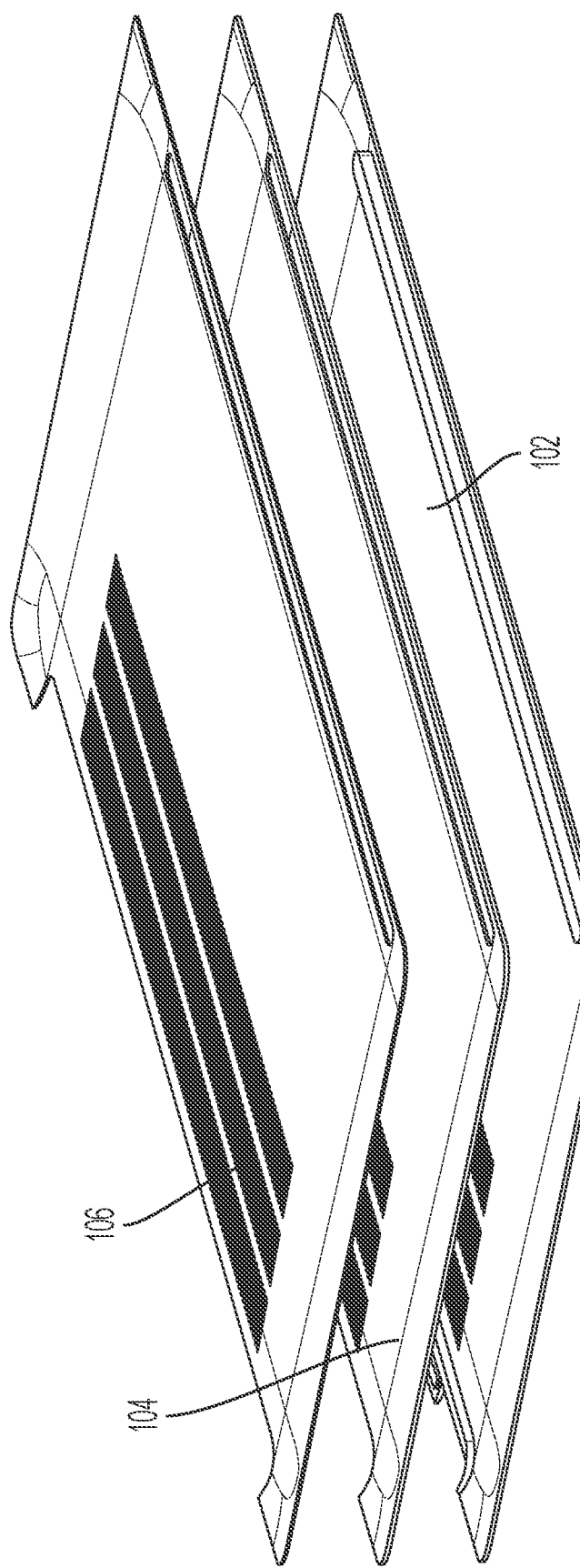
FIG. 2: Exploded view of a "D" covering for an information handling system according to some embodiments of the disclosure.

Referring to FIG. 2, the covering formed into a "D" cover of a laptop, i.e., a back cover of a laptop. In some aspects, the D cover can include a layer of aluminum 102 that can include at least 50% by weight of recycled aluminum. Adjacent to the layer of aluminum 102 is a layer of glass-reinforced polylactic acid 104. The surface of the layer of glass-reinforced polylactic acid 104 that is opposite the layer of aluminum 102 includes a coating of graphene paint 106.

Figure 3:
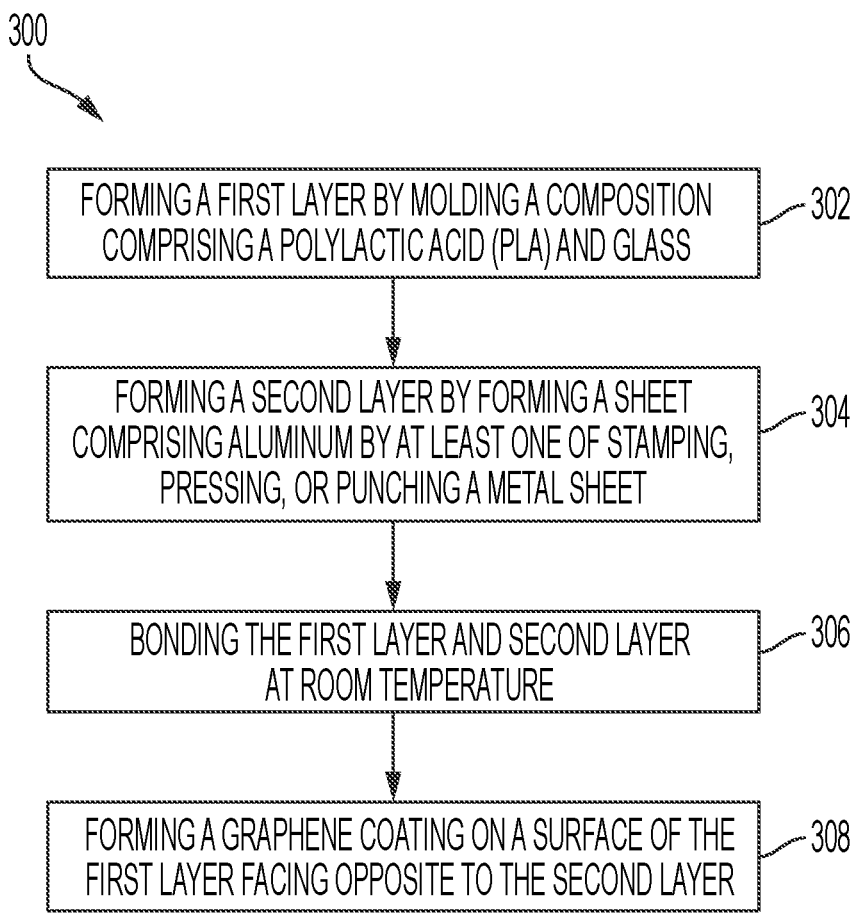
FIG. 3: Flow chart of process steps employed for assembling a covering for an information handling system according to some embodiments of the disclosure.

FIG. 3 depicts process steps 300 that may be employed for assembling a covering for an information handling system according to one example of the present disclosure. In some aspects, the process 300 includes a step 302 wherein a first layer is formed by molding a composition comprising a polylactic acid and a glass reinforcing component. In step 304, a second layer is formed by forming a sheet comprising aluminum. The aluminum can include at least 50% by weight of recycled aluminum. In step 306, the glass-reinforced polylactic acid first layer and the aluminum second layer are bonded together. In step 308, a graphene coating is provided on a surface of the glass-reinforced polylactic acid first layer that is opposite the aluminum second layer.

Figure 4:
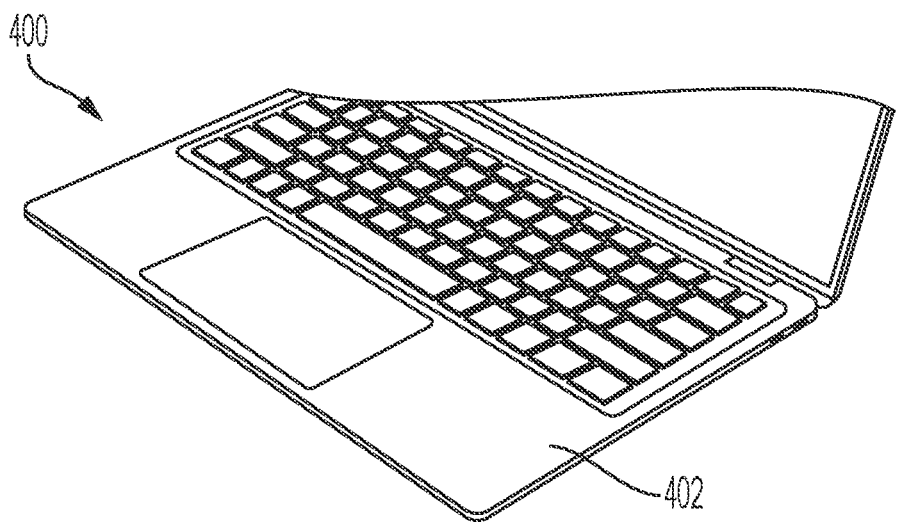
FIG. 4: Schematic of a laptop that includes a "C" covering according to some embodiments of the disclosure.

FIG. 4 is a schematic of a laptop that includes a "C" cover with recycled materials and a bi-layer according to some embodiments of the disclosure. An information handling system 400 may include a "C" covering 402 made of bi-layers according to embodiments of this disclosure, such as the embodiments of FIG. 1. The covering 402 may cover a palm rest and/or extend around a border of a keyboard of the information handling system 400. Other example coverings construed according to embodiments disclosed herein may include an "A" cover (e.g., a top covering fitting a backside of a display facing outward from a closed clamshell laptop) for an information handling system or another covering form, such as a covering that extends across two outer surface of an foldable laptop, or a covering for a 2-in-1 laptop form factor that covers a portion of a top surface facing away from a display that is not a kickstand component.

Figure 5:
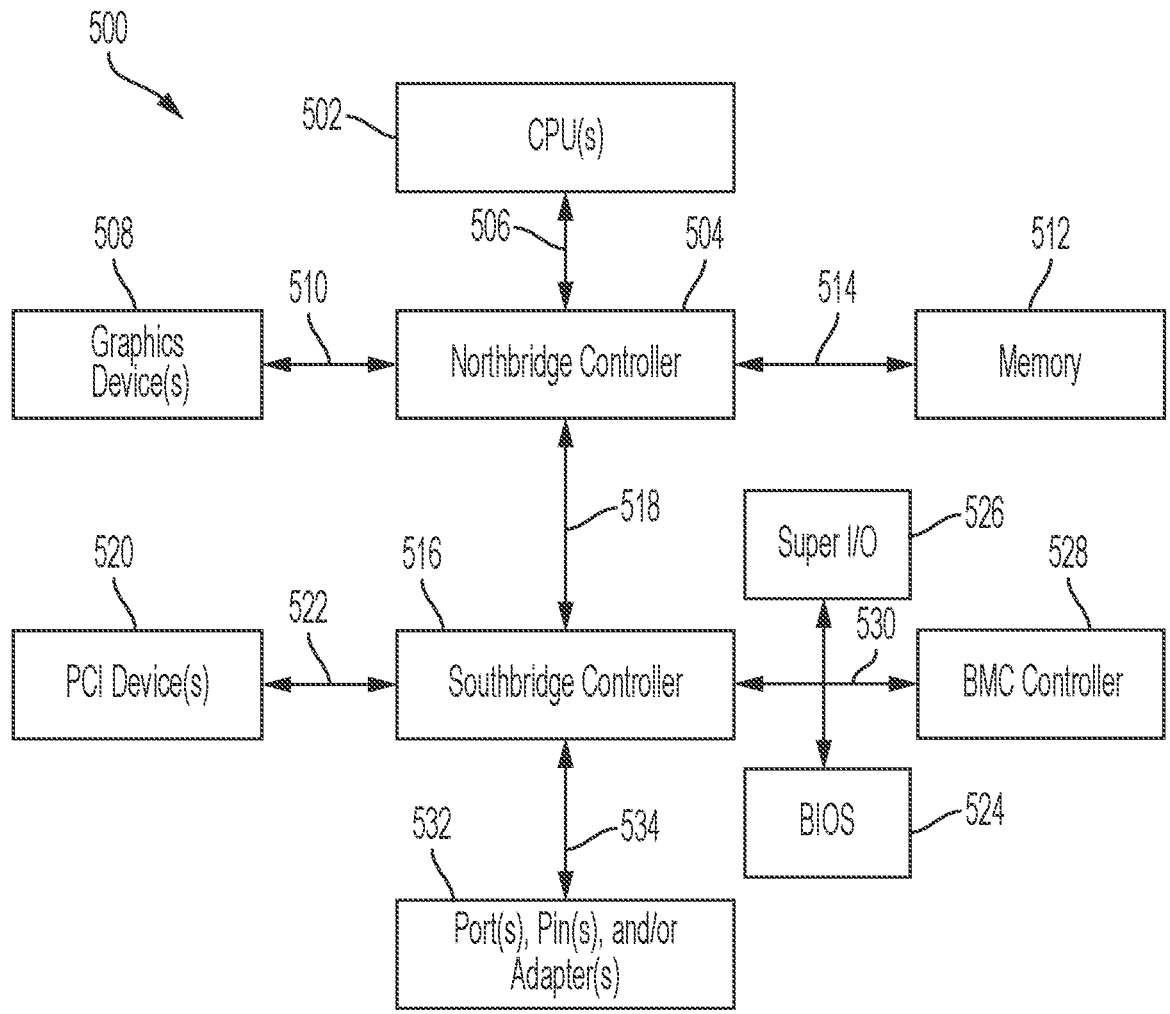
FIG. 5: Schematic of an information handling system that may contain the covering according to some embodiments of the disclosure.

FIG. 5 is a block diagram of an information handling system according to some embodiments of the disclosure. An information handling system may include a variety of components to generate, process, display, manipulate, transmit, and receive information, any of which may generate heat and be coupled to a fan housed in the materials and in the configured in the configurations described in various embodiments herein. One example of an information handling system 500 is shown in FIG. 5. IHS 500 may include one or more central processing units (CPUs) 502. In some embodiments, IHS 500 may be a single-processor system with a single CPU 502, while in other embodiments IHS 500 may be a multi-processor system including two or more CPUs 502 (e.g., two, four, eight, or any other suitable number). CPU(s) 502 may include any processor capable of executing program instructions. For example, CPU(s) 502 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 502 may commonly, but not necessarily, implement the same ISA.

CPU(s) 502 may be coupled to northbridge controller or chipset 504 via front-side bus 506. The front-side bus 506 may include multiple data links arranged in a set or bus configuration. Northbridge controller 504 may be configured to coordinate I/O traffic between CPU(s) 502 and other components. For example, northbridge controller 504 may be coupled to graphics device(s) 508 (e.g., one or more video cards or adaptors, etc.) via graphics bus 510 (e.g., an Accelerated Graphics Port or AGP bus, a Peripheral Component Interconnect or PCI bus, etc.). Northbridge controller 504 may also be coupled to system memory 512 via memory bus 514. Memory 512 may be configured to store program instructions and/or data accessible by CPU(s) 502. In various embodiments, memory 512 may be implemented using any suitable memory technology, such as static RAM (SRAM), synchronous dynamic RAM (SDRAM), nonvolatile/Flash-type memory, or any other type of memory.

Northbridge controller 504 may be coupled to southbridge controller or chipset 516 via internal bus 518. Generally, southbridge controller 516 may be configured to handle various of IHS 500's I/O operations, and it may provide interfaces such as, for instance, Universal Serial Bus (USB), audio, serial, parallel, Ethernet, etc., via port(s), pin(s), and/or adapter(s) 532 over bus 534. For example, southbridge controller 516 may be configured to allow data to be exchanged between IHS 500 and other devices, such as other IHSs attached to a network. In various embodiments, southbridge controller 516 may support communication via wired or wireless data networks, such as any via suitable type of Ethernet network, via telecommunications/telephony networks such as analog voice networks or digital fiber communications networks, via storage area networks such as Fiber Channel SANs, or via any other suitable type of network and/or protocol.

Southbridge controller 516 may also enable connection to one or more keyboards, keypads, touch screens, scanning devices, voice or optical recognition devices, or any other devices suitable for entering or retrieving data. Multiple I/O devices may be present in IHS 500. In some embodiments, I/O devices may be separate from IHS 500 and may interact with IHS 500 through a wired or wireless connection. As shown, southbridge controller 516 may be further coupled to one or more PCI devices 520 (e.g., modems, network cards, sound cards, video cards, etc.) via PCI bus 522. Southbridge controller 516 may also be coupled to Basic I/O System (BIOS) 524, Super I/O Controller 526, and Baseboard Management Controller (BMC) 528 via Low Pin Count (LPC) bus 530.

IHS 500 may be configured to access different types of computer-accessible media separate from memory 512. Generally speaking, a computer-accessible medium may include any tangible, non-transitory storage media or memory media such as electronic, magnetic, or optical media, including a magnetic disk, a hard drive, a CD/DVD-ROM, and/or a Flash memory. Such mediums may be coupled to IHS 500 through various interfaces, such as universal serial bus (USB) interfaces, via northbridge controller 504 and/or southbridge controller 516. Some such mediums may be coupled to the IHS through a Super I/O Controller 526 combines interfaces for a variety of lower bandwidth or low data rate devices. Those devices may include, for example, floppy disks, parallel ports, keyboard and mouse and other user input devices, temperature sensors, and/or fan speed monitoring.

BIOS 524 may include non-volatile memory having program instructions stored thereon. The instructions stored on the BIOS 524 may be usable by CPU(s) 502 to initialize and test other hardware components. The BIOS 524 may further include instructions to load an Operating System (OS) for execution by CPU(s) 502 to provide a user interface for the IHS 500, with such loading occurring during a pre-boot stage. In some embodiments, firmware execution facilitated by the BIOS 524 may include execution of program code that is compatible with the Unified Extensible Firmware Interface (UEFI) specification, although other types of firmware may be used.

BMC controller 528 may include non-volatile memory having program instructions stored thereon that are usable by CPU(s) 502 to enable remote management of IHS 500. For example, BMC controller 528 may enable a user to discover, configure, and/or manage BMC controller 528. Further, the BMC controller 528 may allow a user to setup configuration options, resolve and administer hardware or software problems, etc. Additionally or alternatively, BMC controller 528 may include one or more firmware volumes, each volume having one or more firmware files used by the BIOS firmware interface to initialize and test components of IHS 500.

One or more of the devices or components shown in FIG. 5 may be absent, or one or more other components may be added. Further, in some embodiments, components may be combined onto a shared circuit board and/or implemented as a single integrated circuit (IC) with a shared semiconductor substrate. For example, northbridge controller 504 may be combined with southbridge controller 516, and/or be at least partially incorporated into CPU(s) 502. Accordingly, systems and methods described herein may be implemented or executed with other computer system configurations. In some cases, various elements shown in FIG. 5 may be mounted on a motherboard and enclosed within a chassis of the IHS 500.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. A covering for an information handling system, the covering comprises:
   a first layer comprising a composition comprising a polylactic acid (PLA) and glass; and
   a second layer comprising recycled aluminum, wherein the second layer has a thickness of at least 0.2 mm; and
   a graphene coating on a surface of the first layer facing opposite the second layer.

2. The covering of claim 1, wherein the glass comprises glass fibers.

3. The covering of claim 2, wherein the glass fibers have at least one of an average diameter of 1 to 25 micrometers (μm) or an average length of 0.1 mm to 20 mm.

4. The covering of claim 2, wherein the glass fibers are chopped glass fibers.

5. The covering of claim 1, wherein the PLA has a modulus of 40-120 gpa.

6. The covering of claim 1, wherein the composition comprises 50 wt. % to 90 wt. % of the PLA, and 10 wt. % to 50 wt. % of the glass.

7. The covering of claim 1, wherein the composition has at least one of the following properties:
   a tensile strength of at least 70 MPa, preferably 105 MPa to 130 MPa, as measured in accordance with ASTM D638;
   a flexural strength of at least 110 MPa, preferably 120 MPa to 170 MPa, as measured in accordance with ASTM D790A;
   a flexural modulus of at least 4000 MPa, preferably 7000 MPa to 15000 MPa, as measured in accordance with ASTM D790A;
   a notched Izod impact resistance of at least 20 J/m, preferably 30 J/m to 80 J/m, as measured in accordance with ASTM D256 (⅛ in, 3.2 mm); or
   a heat deflection temperature of at least 80° C. at 0.455 MPa, preferably 130° C. to 200° C. at 0.455 MPa, as measured in accordance with ASTM D648.

8. The covering of claim 1, further comprising:
   a graphene coating on a surface of the second layer facing opposite the first layer.

9. The covering of claim 1, wherein the first layer has a thickness of 0.01 mm to 0.1 mm.

10. The covering of claim 1, wherein the second layer comprises an aluminum alloy comprising the aluminum and at least one of: magnesium, silicon, or chromium.

11. The covering of claim 10, wherein the aluminum alloy comprises at least one of 5052-aluminum alloy, 6061-aluminum alloy, and 6063-aluminum alloy.

12. The covering of claim 1, wherein at least 50 wt. % of the aluminum in the second layer is recycled aluminum.

13. The covering of claim 1, wherein the second layer is an anodized layer.

14. The covering of claim 1, wherein the second layer has a thickness below 0.8 mm, preferably of 0.2 mm to 0.6 mm.

15. The covering of claim 1, wherein the covering forms at least a portion of a front covering, a back covering, and/or a palm rest of the information handling system.

16. A method for forming a covering for an information handling system, the method comprising:
   forming a first layer by molding a composition comprising a polylactic acid (PLA) and glass;
   forming a second layer by forming a sheet comprising aluminum by at least one of stamping, pressing or punching a metal sheet, wherein the second layer has a thickness of at least 0.2 mm;
   bonding the first layer and the second layer at room temperature; and
   forming a graphene coating on a surface of the first layer that is facing opposite to the second layer.

17. An information handling system, comprising:
   a chassis forming at least a partial enclosure around an enclosed volume configured to house components of the information handling system, wherein at least a portion of the chassis comprises:
   a first layer comprising a composition comprising a polylactic acid (PLA) and glass fibers;
   a second layer comprising recycled aluminum, wherein the second layer has a thickness of at least 0.2 mm; and
   a graphene paint on a surface of the first layer facing opposite the second layer.

18. The information handling system of claim 17, wherein the recycled aluminum comprises at least 50% recycled content.

* * * * *